US011897675B2

(12) United States Patent
DeRuntz et al.

(10) Patent No.: US 11,897,675 B2
(45) Date of Patent: Feb. 13, 2024

(54) BEVERAGE CONTAINER STOPPER AND PRESSURIZATION SYSTEM

(71) Applicant: Coravin, Inc., Bedford, MA (US)

(72) Inventors: Otto DeRuntz, Dunstable, MA (US); Michael Rider, Lowell, MA (US)

(73) Assignee: Coravin, Inc., Bedford, MA (US)

( * ) Notice: Subject to any disclaimer, the term of this patent is extended or adjusted under 35 U.S.C. 154(b) by 428 days.

(21) Appl. No.: 17/192,936

(22) Filed: Mar. 5, 2021

(65) Prior Publication Data

US 2021/0276771 A1 Sep. 9, 2021

Related U.S. Application Data

(60) Provisional application No. 63/037,702, filed on Jun. 11, 2020, provisional application No. 62/986,014, filed on Mar. 6, 2020.

(51) Int. Cl.

*B65D 51/24* (2006.01)
*B65D 39/00* (2006.01)
*B65D 39/16* (2006.01)
*B65D 53/02* (2006.01)

(Continued)

(52) U.S. Cl.

CPC .......... *B65D 51/24* (2013.01); *B01F 23/2361* (2022.01); *B65D 39/0052* (2013.01); *B65D 39/16* (2013.01); *B65D 53/02* (2013.01); *B65D 55/12* (2013.01); *B65D 2251/1058* (2013.01); *B65D 2251/20* (2013.01)

(58) Field of Classification Search

CPC .... B65D 51/24; B65D 39/0052; B65D 39/16; B65D 53/02; B65D 55/12; B65D 2251/1058; B65D 2251/20; B65D 45/28; B65D 45/20; B65D 45/02; B01F 23/2361

USPC .......................................................... 141/64

See application file for complete search history.

(56) References Cited

U.S. PATENT DOCUMENTS 5,056,676 A 10/1991 Allen et al.
5,803,288 A 9/1998 Munini (Continued)

FOREIGN PATENT DOCUMENTS

GB 2 546 755 A 8/2017
IT PD20090022 A1 8/2010
WO WO 2008/019443 A1 2/2008

OTHER PUBLICATIONS

PCT/US2021/021029, Jul. 8, 2021, Invitation to Pay Additional Fees.

(Continued)

*Primary Examiner* — Timothy P. Kelly
*Assistant Examiner* — Christopher M Afful
(74) *Attorney, Agent, or Firm* — Wolf, Greenfield & Sacks, P.C.

(57) ABSTRACT

A stopper for closing sparkling and other non-pressurized beverage containers. A stopper body may have a carrier member and lip engagement member arranged for sliding movement relative to each other and relative to the stopper body. The lip engagement member may be arranged to engage with a lip of a container neck, and be resiliently biased to move toward the carrier member to provide a seal-forming force on a sealing surface of the stopper body. The stopper may be arranged to introduce gas into the container, e.g., to re-pressurize the container to keep a carbonation level of beverage during storage.

21 Claims, 10 Drawing Sheets

(51) Int. Cl.
*B65D 55/12* (2006.01)
*B01F 23/2361* (2022.01)

(56) References Cited

U.S. PATENT DOCUMENTS

| | | | | |
|---|---|---|---|---|
| 5,957,313 | A * | 9/1999 | Bouan | B65D 55/022 220/230 |
| 6,213,323 | B1 * | 4/2001 | Ferrari | B65D 45/22 215/277 |
| 9,248,416 | B2 | 2/2016 | Striebinger | |
| 10,160,560 | B2 | 12/2018 | Schovain | |
| 2014/0360971 | A1 | 12/2014 | Marino | |
| 2015/0201794 | A1 | 7/2015 | Hoffmann | |

OTHER PUBLICATIONS

PCT/US2021/021029, Aug. 31, 2021, International Search Report and Written Opinion.
International Preliminary Report on Patentability for International Application No. PCT/US2021/021029, dated Sep. 15, 2022.
Invitation to Pay Additional Fees for International Application No. PCT/US2021/021029, dated Jul. 8, 2021.
International Search Report and Written Opinion for International Application No. PCT/US2021/021029, dated Aug. 31, 2021.

* cited by examiner

BEVERAGE CONTAINER STOPPER AND PRESSURIZATION SYSTEM

RELATED APPLICATIONS

This application claims priority under 35 U.S.C. § 119(e) to U.S. Provisional Application Serial Nos. 62/986,014 filed Mar. 6, 2020, and 63/037,702 filed Jun. 11, 2020, each of which is herein incorporated by reference in its entirety.

BACKGROUND OF INVENTION

This invention relates generally to dispensing fluid from a container, e.g., pouring of sparkling wine from a wine bottle, and subsequent resealing of the container, e.g., to retain carbonation in the beverage.

SUMMARY OF INVENTION

One or more embodiments in accordance with aspects of the invention allow a user to dispense a beverage, such as wine, from a bottle or other container. In some cases, dispensing of liquid from such a bottle may be performed one or more times, and a stopper may be engaged with the bottle after each beverage dispensing to seal closed the interior of the bottle. Thus, the beverage may be dispensed from the bottle multiple times and stored for extended periods between each dispensing while minimizing effect on beverage quality. In some embodiments, little or no gas, such as air, which is reactive with the beverage, may be introduced into the bottle after dispensing of beverage from within the bottle. Thus, in some embodiments, a user may dispense wine from a wine bottle and subsequently seal the bottle from air or other potentially damaging gasses or liquids entering into the bottle. In some embodiments, a pressure above ambient pressure may be maintained in the bottle after dispensing is complete, which may help maintain a carbonation level in a sparkling beverage, and such pressure may be established by introducing pressurized gas through the stopper.

In one embodiment, a stopper is provided for use with a beverage container having a neck, an opening at the neck to access an interior space of the container, and a lip on an outer surface of the neck. The stopper may include a stopper body having a sealing surface arranged to contact and form a seal with a portion of the neck around the opening, e.g., to seal the interior space of the bottle from gasses or other external environmental conditions. A carrier member may be mounted for movement relative to the stopper body, e.g., in directions toward and away from the stopper body and/or the sealing surface. A lip engagement member may also be mounted for movement relative to the stopper body (e.g., toward and away from the stopper body and/or sealing surface) and relative to the carrier member (e.g., toward and away from the carrier member). For example, the lip engagement member may be mounted to the carrier member so as to move with the carrier member in some conditions, but be capable of movement relative to the carrier member in other conditions. The lip engagement member may include a pawl mounted for movement between a lip engaging position for engaging with the lip on the container neck and a release position in which the pawl may be prevented from engaging with the lip. For example, the pawl may be mounted for pivotal movement between the lip engaging and release positions. The lip engagement member may be resiliently biased for movement toward the carrier member by a first resilient element, and this resilient bias may urge the container neck into contact with the sealing surface, helping to establish and/or maintain a seal at the container opening. For example, with the lip engagement member engaged with the container lip, the carrier member may be moved toward the stopper body, which may cause the lip engagement member to urge the container lip, and therefore a portion of the container at the opening, toward the sealing surface. The resilient bias that urges the lip engagement member to move toward the carrier member may help establish a seal at the container opening, as well as allow the stopper to accommodate differently sized container arrangements, e.g., different distances between a container lip and opening area where a seal with the sealing surface is established. The resilient bias may also be part of a detent that operates to keep a handle that is used to move the carrier member and lip engagement member in a closed position.

In some embodiments, movement of the carrier member toward the stopper body urges the pawl to move toward the sealing surface. For example, the lip engagement member may be resiliently biased to move toward the carrier member or otherwise coupled for movement with the carrier member, and so movement of the carrier member toward the stopper body may urge the pawl to move toward the sealing surface. This may cause the pawl to urge the container neck into contact with the sealing surface.

In some cases, the carrier member is resiliently biased to move away from the stopper body by a second resilient element, at least in a portion of a range of movement of the carrier member relative to the stopper body. This biasing may help move the carrier member and lip engagement member to a position in which a container neck is disengaged by the stopper. For example, in some cases, movement of the lip engagement member may cause the pawl to move between the lip engaging and release positions. If movement of the carrier member is coupled with movement of the lip engagement member, movement of the carrier member may cause the pawl to move between the lip engaging and release positions. Thus, a bias that causes the carrier member to move away from the stopper body may cause the pawl to move to a release position, allowing the stopper to disengage from the container.

In some embodiments, the stopper may include a carrier drive arranged to move the carrier member relative to the stopper body. Where movement of the carrier member and lip engagement member are coupled together, the carrier drive may operate to move the lip engagement member as well. In one embodiment, the carrier drive may include a cam and cam follower arranged to move the carrier member relative to the stopper body based on rotation of the cam. For example, the cam may be pivotally mounted to the stopper body for rotation, and the cam follower may be arranged on the carrier member so that rotation of the cam causes the carrier member to move. The carrier drive may include a handle attached to the cam and arranged for movement by a user to rotate the cam, e.g., so the user can move the carrier member relative to the stopper body. In other arrangements, the handle may be arranged to move the carrier member and lip engagement member in other ways, i.e., without a cam and cam follower configuration but instead via another linkage arrangement.

In some embodiments, the stopper includes a handle movable between a closed position, an intermediate position and an open position, wherein the intermediate position is between the open and closed positions. The carrier member and lip engagement member may be coupled to the handle so that with the handle in the open position, the carrier member and the lip engagement member may be positioned away from the stopper body and the pawl is in the release position to disengage from a container neck. This arrangement also allows the stopper to be removed from a container because the pawl is in the release position. Movement of the handle from the open position to the closed position may move the pawl to the lip engaging position and move the carrier member and the lip engagement member toward the stopper body. For example, after a container is received by the stopper, the handle may be moved to cause the pawl to move to engage with the lip of the container. Continued movement of the handle toward the closed position may cause movement of the lip engagement member toward the stopper body until the pawl engages with the lip and the sealing surface engages with the portion of the neck around the opening. At this point, the carrier member may continue movement toward the stopper body and away from the lip engagement member against the urging of the first resilient element. However, the lip engagement member may cease movement toward the stopper body because the engagement of the pawl with the lip of the container and contact of the container with the sealing surface may prevent further movement of the lip engagement member toward the stopper body. Movement of the carrier member toward the stopper body and away from the lip engagement member against the urging of the first resilient element (which urges the lip engagement member to move toward the carrier member) may cause the lip engagement member to resiliently urge the container into contact with the sealing surface, helping to establish a seal at the container opening.

In some cases, movement of the handle from the closed position to the intermediate position causes the carrier member and the lip engagement member to move away from the stopper body such that the seal at the sealing surface is broken but the pawl remains in the lip engaging position, preventing the stopper from being removed from the container. This may enable venting of the interior space of the container while maintaining engagement of the stopper with the container.

In one embodiment, sliding movement of the lip engagement member away from the stopper body moves the pawl from the lip engaging position to the release position, and movement of the lip engagement member toward the stopper body moves the pawl from the release position to the lip engaging position. As a result, movement of the lip engagement member may control whether the pawl is in the release position or the lip engaging position. For example, when the handle is in the open position, the lip engagement member may be positioned relative to the stopper body by the handle to cause the pawl to be in the release position. In contrast, when the handle is in the closed position, the lip engagement member may be positioned relative to the stopper body to cause the pawl to be in the lip engaging position. In one embodiment, the stopper body includes a sidewall that defines a cavity into which the neck of the container is received, and the sidewall may include an opening into which the pawl extends in the lip engaging position to engage with the lip of the container. The pawl may be spring biased to move toward the lip engaging position and movement of the lip engagement member away from the stopper body (e.g., in response to handle movement toward the open position) may cause a portion of the sidewall at the opening to contact the pawl and move the pawl to the release position against the spring bias. When the lip engagement member moves toward the stopper body (e.g., in response to handle movement toward the closed position), the pawl may be moved out of contact with the portion of the sidewall at the opening, allowing the pawl to move to the lip engaging position.

In one embodiment, the stopper body includes a cup-shaped body having a sidewall that defines a cavity and an opening at a lower end to receive the neck of the container into the cavity. The sealing surface may be located in the cavity at a side opposite the opening, e.g., so that a container neck must be fully received into the cavity to cause the portion of the container at the opening to contact the sealing surface. The lip engagement member may include a sleeve positioned around the sidewall of the stopper body and be slidably movable relative to the stopper body. The pawl may be pivotally mounted to the sleeve, e.g., for movement about a horizontal axis or axis perpendicular to the sliding movement direction of the lip engagement member relative to the stopper body. The carrier member may include a ring positioned around the sidewall of the stopper body and be slidably movable relative to the stopper body. The carrier member may include a guide along which the sleeve of the lip engagement member is movable relative to the carrier member, with the guide including the first resilient element in the form of a spring arranged to bias the sleeve to move toward the ring. For example, two or more guides may extend from the carrier member ring and engage with the lip engagement member sleeve to guide movement of the sleeve relative to the ring.

In some embodiments, the stopper body includes a gas pathway that extends from a gas inlet to a gas outlet and is arranged to introduce pressurized gas into the container. For example, the gas pathway may extend from a top of the stopper body where the gas inlet is located to a location adjacent the sealing surface where the gas outlet is located. A check valve or other one-way valve may be provided in the gas pathway to prevent flow from the gas outlet to the inlet. Thus, pressurized gas may be introduced into a container engaged by the stopper to place the beverage under pressure. The stopper may include a vent, e.g., to vent pressure in the container over a threshold and prevent potentially high pressure conditions in the container. The stopper may also include a pressure indicator, e.g., to indicate whether pressure in the container is below or above a threshold.

In some embodiments, a stopper may include a stopper body having a sealing surface arranged to contact and form a seal with a portion of the neck around the opening, and a lip engagement member including a pawl mounted for pivotal movement between a lip engaging position for engaging with the lip on the container neck and a release position for disengaging from a container. The lip engagement member may be mounted for sliding movement relative to the stopper body, and a handle may be arranged to move the lip engagement member relative to the stopper body. For example, the handle may be pivotally mounted about a horizontal axis to the stopper body and movable between a closed position, an intermediate position and an open position, with the intermediate position being between the open and closed positions. Movement of the handle relative to the stopper body may cause movement of the lip engagement member toward and away from the stopper body, and with the handle in the open position, the lip engagement member may be positioned away from the stopper body and the pawl is in the release position to allow the stopper to receive or disengage from the container neck. With the handle in the closed position the pawl is in the lip engaging position and the lip engagement member is positioned toward the stopper body to urge the sealing surface to engage with the portion of the neck around the opening to form the seal. Movement of the handle from the closed position to the intermediate position may cause the lip engagement member to move away from the stopper body such that the seal is broken (allowing venting of the interior space of the container) but the pawl remains in the lip engaging position to prevent removal of the stopper from the container.

In some embodiments, a carrier member is mounted for sliding movement relative to the stopper body, and the lip engagement member may be slidably movable relative to the carrier member and be resiliently biased for movement toward the carrier member by a first resilient element. Movement of the handle may cause movement of the carrier member toward and away from the stopper body, e.g., movement of the handle to the open position may move the carrier member away from the stopper body and movement of the handle to the closed position may move the carrier member toward the stopper body. Movement of the carrier member toward the stopper body may urge the pawl to move toward the sealing surface, and thus urge a container neck engaged by the pawl to move toward the sealing surface. In some cases, the carrier member is resiliently biased to move away from the stopper body by a second resilient element.

The handle may be coupled to the lip engagement member in different ways, e.g., a cam and cam follower may be arranged to move the carrier member relative to the stopper body based on rotation of the cam which is coupled to the handle. The cam may be pivotally mounted to the stopper body for rotation, and the cam follower may be arranged on the carrier member so that rotation of the cam causes movement of the carrier member.

In some cases, with the handle in the open position, the carrier member and the lip engagement member may be positioned away from the stopper body and the pawl is in the release position to receive the container neck. Movement of the handle from the open position to the closed position moves the pawl to the lip engaging position and moves the carrier member and the lip engagement member toward the stopper body. Movement of the lip engagement member toward the stopper body may continue with movement of the handle toward the closed position until the pawl engages with the lip and the sealing surface engages with the portion of the neck around the opening whereupon the carrier member continues movement toward the stopper body and away from the lip engagement member against urging of the first resilient element. However, the lip engagement member may cease movement toward the stopper body even though the handle continues movement toward the closed position.

In some embodiments, the stopper body includes a sidewall that defines a cavity into which the neck of the container is received, and the sidewall includes an opening into which the pawl extends in the lip engaging position to engage with the lip of the container. The pawl may be spring biased to move toward the lip engaging position and movement of the lip engagement member away from the stopper body may cause a portion of the sidewall at the opening to contact the pawl and move the pawl to the release position against the spring bias. For example, the stopper body may include a cup-shaped body having a sidewall that defines a cavity and an opening at a lower end to receive the neck of the container into the cavity. The sealing surface may be located in the cavity at a side opposite the opening. The lip engagement member may include a sleeve positioned around the sidewall of the stopper body and be slidably movable relative to the stopper body. Movement of the sleeve away from the cup-shaped body may cause a portion of the pawl to contact the cup-shaped body at the opening into which the pawl extends and move the pawl to the release position. A guide may be provided along which the sleeve of the lip engagement member is movable relative to the stopper body, and the guide may include a spring arranged to bias the sleeve to move toward the stopper body. In some cases, movement of the handle may move the guide relative to the stopper body, and thereby cause movement of the lip engagement member.

In some embodiments, the stopper body includes a gas pathway that extends from a gas inlet to a gas outlet and is arranged to introduce pressurized gas into the container. For example, the gas pathway may extend from a top of the stopper body where the gas inlet is located to a location adjacent the sealing surface where the gas outlet is located to introduce pressurized gas into the container. A check valve or other one-way valve may be provided in the gas pathway to prevent flow from the gas outlet to the inlet. A vent and/or pressure indicator may be provided with the stopper as well, as discussed above.

In some embodiments, a stopper can be configured to release pressure from inside of a container sealed by the stopper by manipulating the stopper on the container. That is, the stopper can be engaged with the container to seal the interior of the container closed, e.g., holding pressure above ambient in the container, and by moving the stopper relative to the container without disengaging the stopper from the container, pressure inside the container can be vented, e.g., by a momentary break in the seal between the stopper and container. As an example, a user can tilt the stopper relative to the container in a way that a sealing surface engaged with the opening of the container disengages from contact in one or more areas to release pressure or otherwise vent the container interior. In some embodiments, the seal can be resiliently engaged with the container at the opening so that manipulation of the stopper body moves the sealing surface relative to the opening so as to momentarily cause a break in the sealing engagement while the sealing surface remains resiliently biased to engage with the opening. Thus, the interior of a container can be vented without removing the stopper from the container.

In some embodiments, a stopper includes a stopper body having a sealing surface arranged to contact and form a seal with a portion of the neck around the opening, and a lip engagement member including a pawl configured to engage with the lip on the container neck. A first resilient element, such as one or more springs, can be configured to cause the sealing surface to resiliently engage with the portion of the neck around the opening. For example, a spring or other resilient element can be configured to bias the sealing surface to move into engagement with a container opening by being positioned between the sealing surface and the stopper body, between the lip engagement member and the stopper body, between the pawl and the lip engagement member, and/or included with a coupling component between the lip engagement member and the sealing surface (such as with a carrier member that couples the lip engagement member to the stopper body). The stopper can be configured to seal the interior space of the container closed when the stopper body is at a rest position and the first resilient element causes the sealing surface to resiliently engage with the portion of the neck around the opening. A rest position can be one in which the stopper supports itself on the container, seals the container opening closed, and is untouched by a user. The stopper can be configured to at least partially disengage the sealing surface from the portion of the neck around the opening and vent the interior space in response to manipulation of the stopper body from the rest position relative to the container while the first resilient element causes the sealing surface to resiliently engage with the portion of the neck around the opening. For example, a user can tilt or rotate the stopper about a horizontal axis relative to the container while the container is maintained in generally vertically oriented, and this manipulation of the stopper can permit venting of the container interior space.

Various exemplary embodiments of the device are further depicted and described below.

BRIEF DESCRIPTION OF THE DRAWINGS

Aspects of the invention are described with reference to various embodiments, and to the figures, which include.

DETAILED DESCRIPTION

Aspects of the invention are described below with reference to illustrative embodiments, but it should be understood that aspects of the invention are not to be construed narrowly in view of the specific embodiments described. Thus, aspects of the invention are not limited to the embodiments described herein. It should also be understood that various aspects of the invention may be used alone and/or in any suitable combination with each other, and thus various embodiments should not be interpreted as requiring any particular combination or combinations of features. Instead, one or more features of the embodiments described may be combined with any other suitable features of other embodiments.

Figure 1:
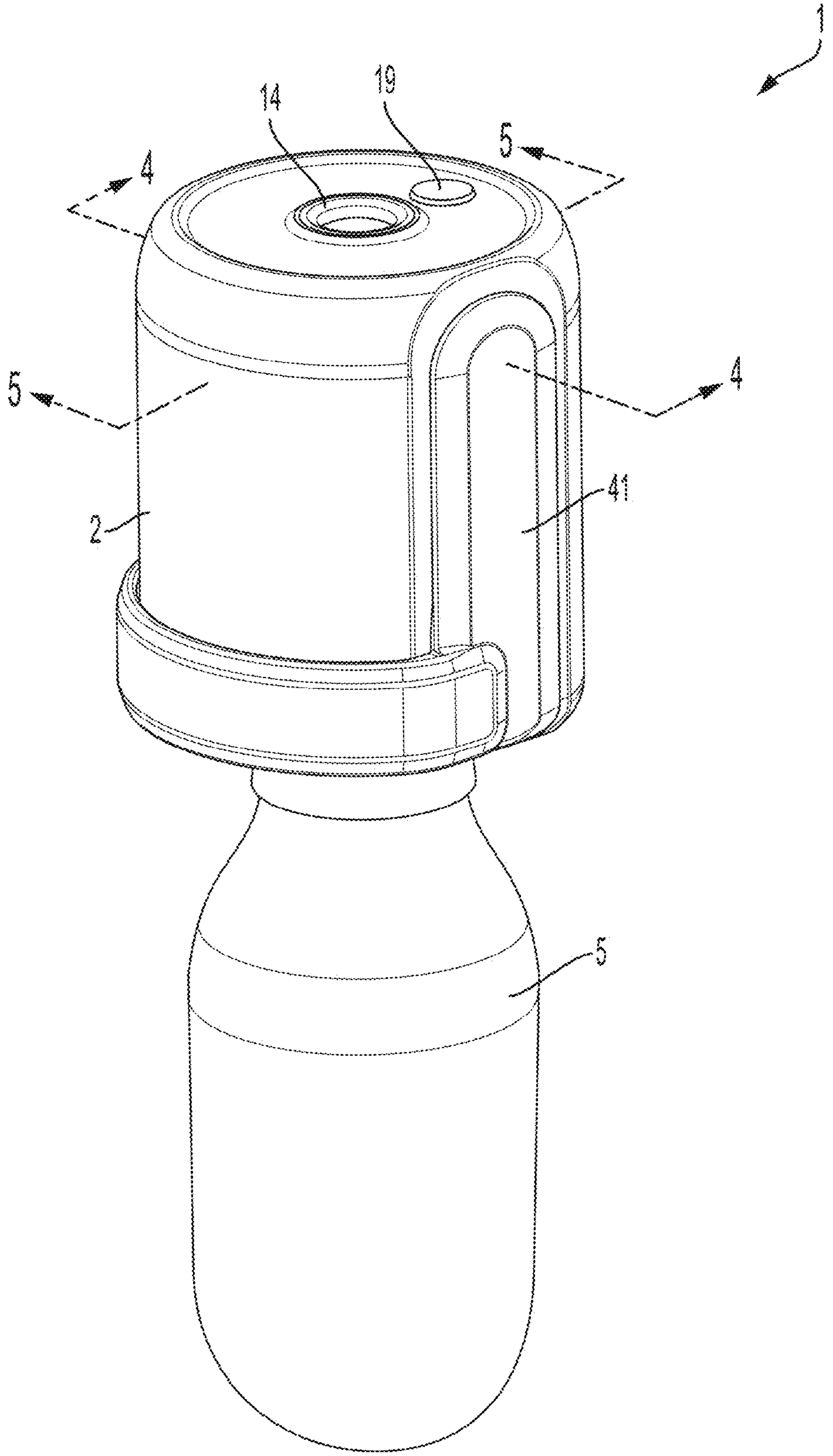
FIG. 1 shows a perspective view of a stopper in an illustrative embodiment.
Figure 2:
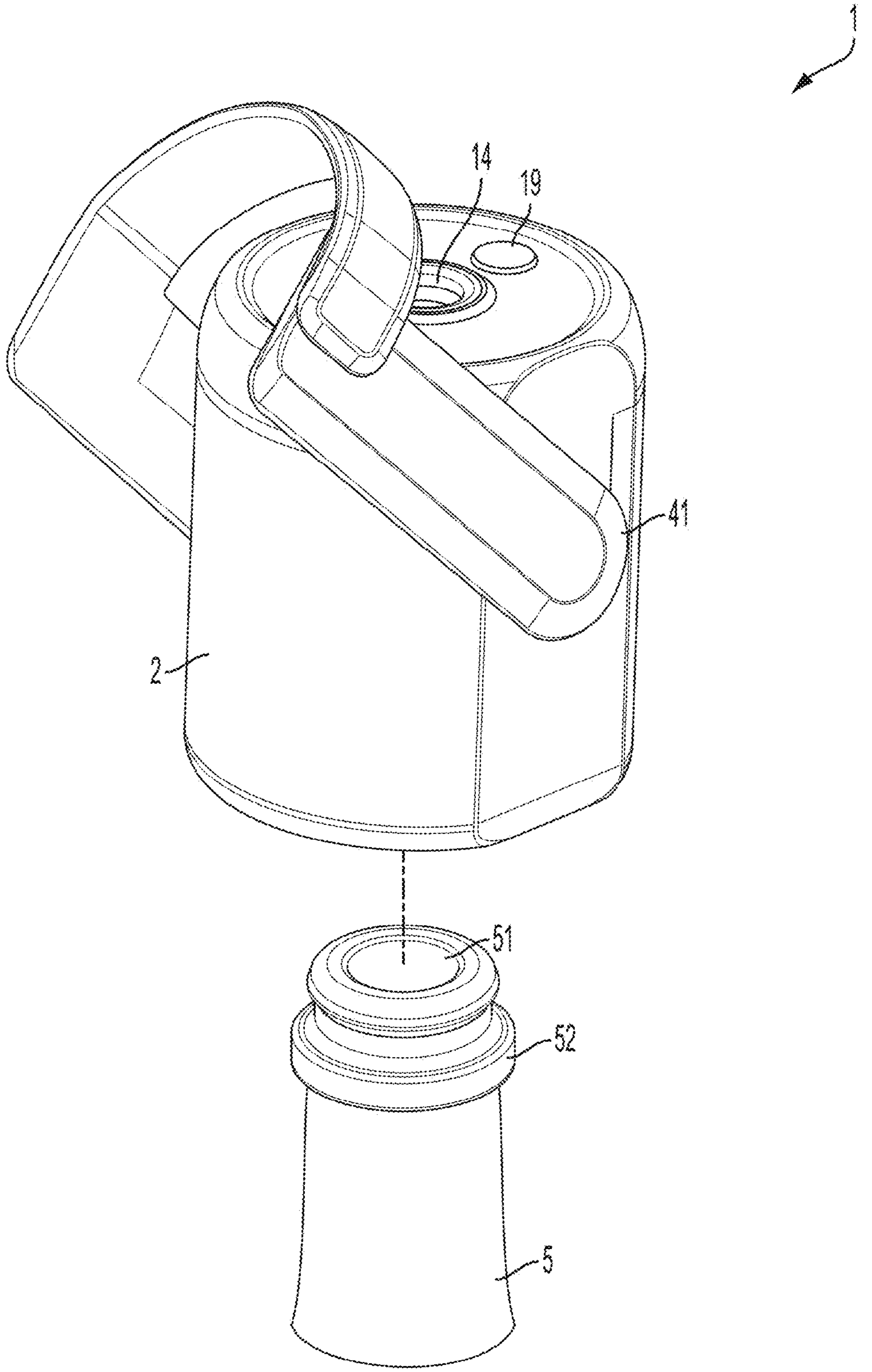
FIG. 2 shows a perspective view of the FIG. 1 stopper with the handle in the open position.

FIGS. 1 and 2 show a stopper 1 for use with a container 5, such as a container 5 that holds a sparkling beverage and that initially has a cork or other closure that seals an opening 51 of the container 5. Thus, the cork or other closure may be removed from the opening 51 to allow pouring of beverage from the container and the stopper 1 may be used to re-seal or close the opening 51. As discussed more below, the stopper 1 may permit the interior space of the container 5 to be pressurized, e.g., so that a carbonated beverage may remain carbonated during storage with the stopper 1, but this is not required. As is the case with many sparkling and other wine bottles, the neck of the container includes a lip 52 below the opening 51 that is used to engage with a metal cap and wire retainer or other component that helps keep the cork or other closure in the opening 51. With the cork retainer and the cork or other closure removed as shown in FIG. 2, the opening 51 of the container 5 is open for dispensing beverage. Thereafter, the stopper 1 may be engaged with the container 5 to seal the opening 51 closed as shown in FIG. 1, and later removed as shown in FIG. 2 to permit further dispensing of beverage from the container 5.

In this embodiment, the stopper 1 includes a handle 41 that can be moved between a closed position shown in FIG. 1 and an open position shown in FIG. 2. With the handle 41 in the closed position, the stopper 1 may be secured to the container 5 so that the stopper 1 cannot be removed and so that the opening 51 is sealed closed, e.g., to hold a pressure in the container above ambient. With the stopper 1 secured to the container 5, pressurized gas may be introduced into the container 5 via a gas inlet port 14, e.g., pressurized CO2 or other gas may be introduced into the container to pressurize the interior space of the container 5. The stopper 1 may include a pressure indicator 19, such as a colored light, numerical display, or other indicator that provides an indication of pressure in the container 5. For example, the pressure indicator 19 may indicate a red light when pressure in the container 5 is below threshold, and a green light when the pressure is above the threshold. In some cases, the pressure indicator 19 may provide no light indication (neither red nor green) when the pressure in the container is at or around ambient, which is also the case when the stopper 1 is not engaged with a container 5. The stopper 1 may include a vent feature to release pressure in the interior space of the container 5 above a threshold, e.g., to prevent storage of the container 5 with a higher than desired pressure in case too much pressurized gas is introduced into the container. With the handle 41 in the open position, the stopper 1 can be removed from the container 5 to allow pouring from the container 5, and to allow the stopper 1 to be placed onto a container neck. In accordance with an aspect of the invention and as described more below, the handle 41 may be moved to an intermediate position between the closed and open positions whereby the seal between the stopper 1 and the container opening 51 is broken, but the stopper 1 remains secured to the container 5 so the stopper 1 cannot be removed. This may allow the interior space of the container 5 to be vented of any internal pressure (e.g., ambient pressure can be established in the interior space) while minimizing risk that the stopper 1 will be forcibly ejected from the container 5 by escaping gas. In some embodiments, the interior space of the container can be vented without moving the handle 41, e.g., while the handle 41 remains in the closed position. As described more below, some stopper configurations can allow the stopper to be manipulated relative to the container while the stopper is engaged with the container so that a sealing surface that establishes a seal with a portion of the container at the opening 51 momentarily or otherwise breaks sufficient contact with a portion of the container so that pressure in the interior space can be vented. In some cases, the stopper 1 can be manipulated by tilting or rotating the stopper 1 about an axis that is perpendicular to a longitudinal axis of the container (e.g., the longitudinal axis can be along to a direction in which a cork or other closure is inserted/removed from the opening 51 of the container and/or along a direction in which the container neck is received by the stopper 1). Tilting or rotating of the stopper 1 can cause a sealing surface to lose contact or reduce a contact force with the container so that a seal with the container is at least partially broken to allow pressure to escape from the container. This can allow pressure release or other venting of the container without taking any action to disengage the stopper from the container, and thus may reduce risk that the stopper will disengage entirely from the container while pressure is held in the interior space.

Figure 3:
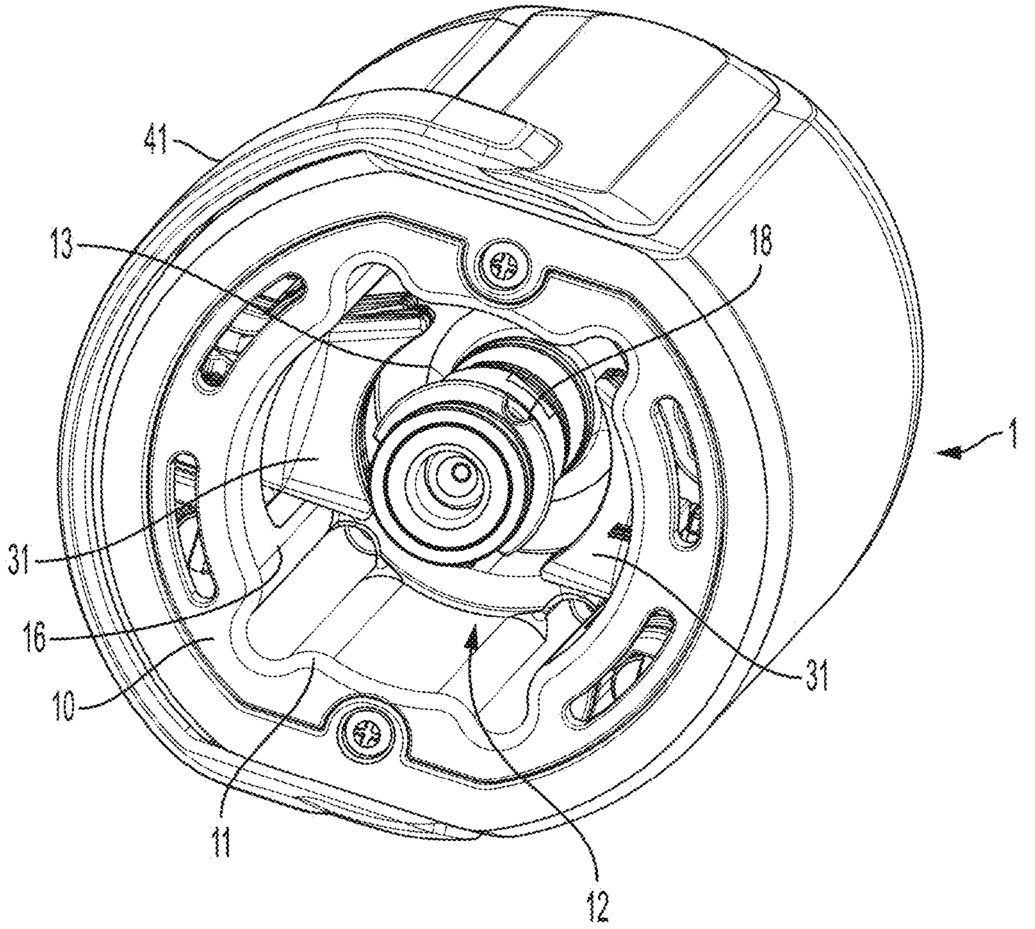
FIG. 3 shows a bottom perspective view of the FIG. 1 stopper showing a container neck receiving cavity.
Figure 4:
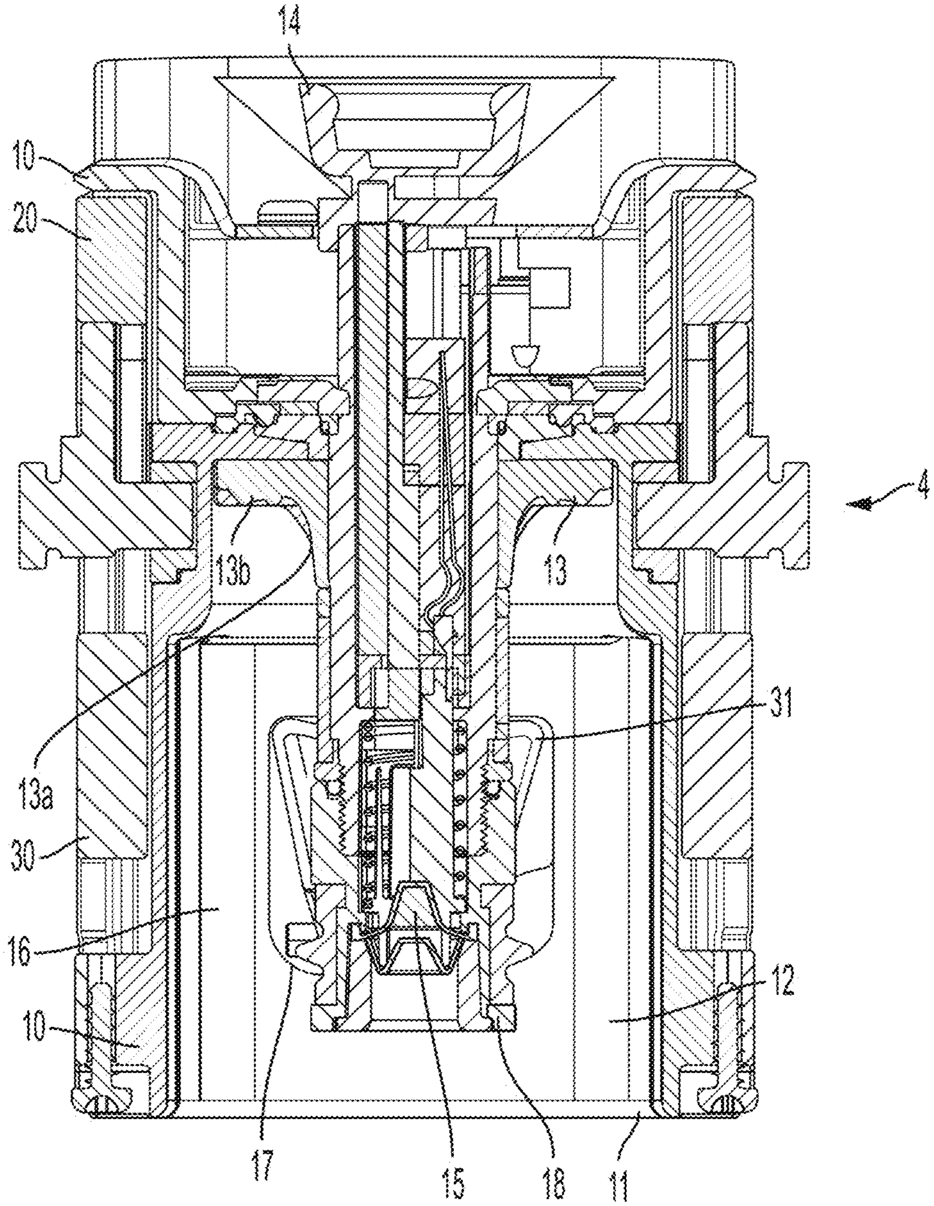
FIG. 4 shows a cross sectional view of the stopper along the line 4-4 in FIG. 1.
Figure 5:
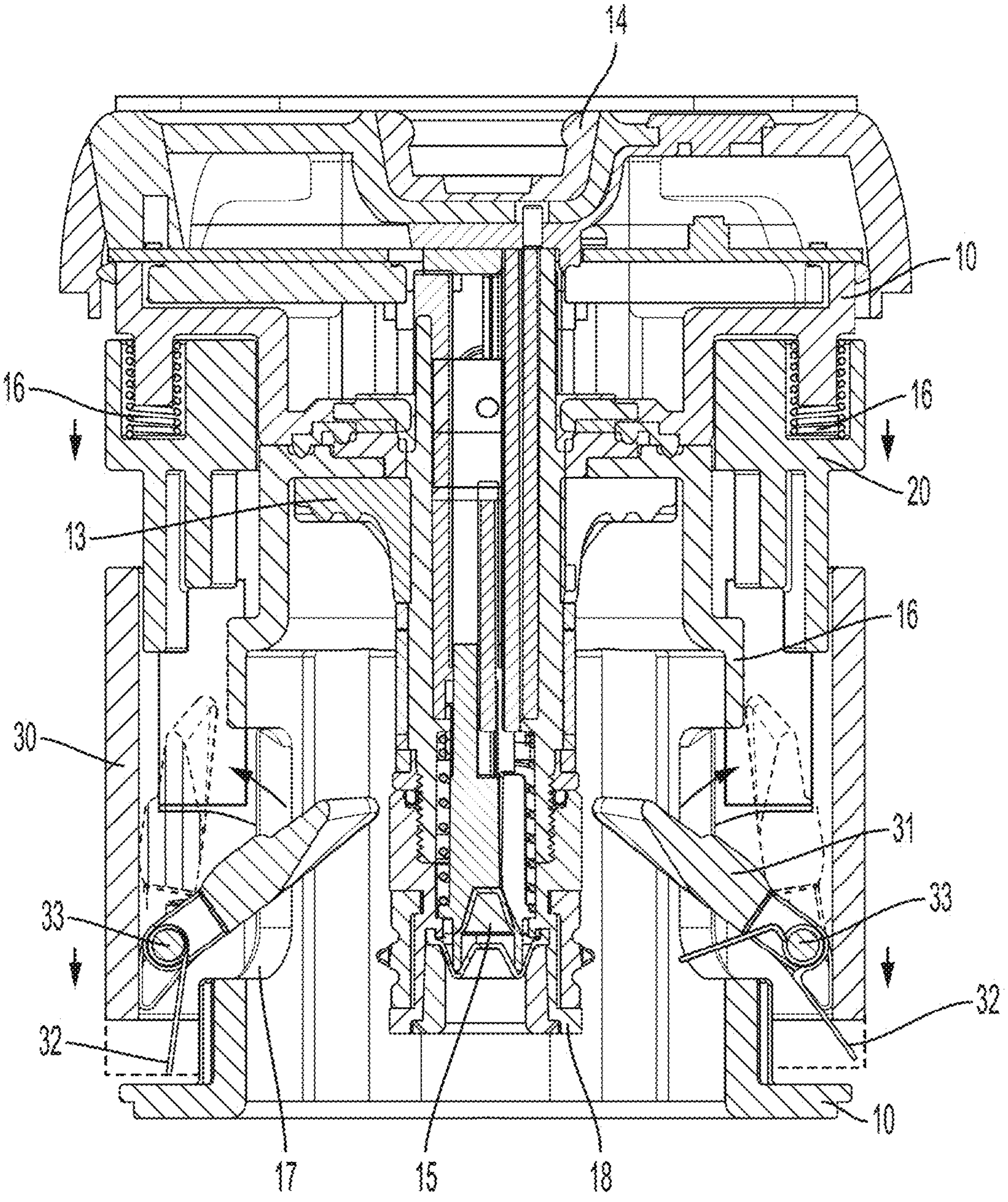
FIG. 5 shows a cross sectional view of the stopper along the line 5-5 in FIG. 1.

FIG. 3 shows a bottom view of the stopper 1 and illustrates a stopper body 10 located within the outer housing 2 of the stopper 1 that includes an opening 11 to provide access to a cavity 12 defined by a sidewall 16 of the body 10. The neck of a container 5 can be received into the cavity 12 so that the stopper 1 can engage with the container 5 to seal the opening 51 closed. In some embodiments, one or more pawls 31 may engage with the lip 52 of the container 5 to secure the stopper 1 to the container 5 as well as urge a sealing surface 13 at a side of the cavity 12 opposite the opening 11 into contact with a portion of the neck around the opening 51 of the container 5 to form a seal with the container 5. An insert 18 of the stopper body 10 may be inserted into the opening 51 of the container 5, e.g., to help stabilize the stopper 1 relative to the container 5, help form a seal with the container 5 such as by sealingly engaging with an inner surface of the container neck, and/or to position components of the stopper 1 such as a pressure sensor inside the container 5. In some cases, the insert 18 may be sized and/or shaped to allow the stopper 1 to be tilted or otherwise moved relative to the container to allow venting of the interior space of the container while the stopper is engaged with the container. For example, the insert 18 may be suitably small in diameter and/or length to allow tilting of the stopper without contact or other interference by the insert 18 with the interior surface of the container. The insert 18 may include a gas outlet through which pressurized gas introduced at the gas inlet 14 is introduced into the container interior space, a vent to release high pressure from the interior space, or other components. For example, FIGS. 4 and 5 show a check valve 15 in the gas pathway near the gas outlet that permits flow from the gas inlet 14 into the container 5, but resists flow from the container 5 to the gas inlet 14. The insert 18 may also include a pressure sensor arranged as a movable plunger in the insert 18. The plunger may be spring loaded, i.e., biased to move in the insert 18 in a downward direction in FIGS. 4 and 5 and otherwise sealed in the gas pathway to prevent flow from the container past the plunger. Pressure in the container 5 will urge the plunger to move upwardly in the insert 18, against the spring bias. The extent of movement of the plunger will indicate pressure in the container 5, and the movement of the plunger can be detected by a suitable sensor or other arrangement, such as a Hall effect sensor, a magnet/reed sensor, one or more switches that are activated by plunger movement, etc. The sensor arrangement can provide an indication of pressure, such as by causing illumination of one or more LEDs, display of a numerical pressure indication, physical movement of a pressure dial or other indicator, etc.

FIGS. 4 and 5 respectively show cross sectional views along the lines 4-4 and 5-5 in FIG. 1, but with the handle 41 and outer housing 2 of the stopper 1 removed for clarity. When a container 5 neck is received into the cavity 12, e.g., by placing the opening 11 of the stopper 1 over the top of the container 5, the insert 18 is received into the opening 51 of the container 5 and the upper surface of the neck near the opening 51 is positioned in contact with or at least near the sealing surface 13, which may include a gasket including a suitably resilient or otherwise arranged material to form a seal with the container 5 at the opening 51. The sealing surface 13 may include a radially inner conical portion 13*a* and a radially outer flat portion 13*b*. The conical portion 13*a* may help form a seal with an opening 51 at an inner surface of the opening 51, and the flat portion 13*b* may help form a seal with an outer surface of the opening 51. To receive the neck into the cavity 12 (or disengage the stopper 1 from a container 5), the handle 41 is moved to the open position shown in FIG. 2 which causes the pawls 31 to move to a release position shown in dashed line in FIG. 5. This allows the lip 52 and other portions of the neck to be received into (or removed from) the cavity 12 without interference by the pawls 31. The pawls 31 are pivotally mounted about a pivot axis 33 to a lip engagement member 30 so the pawls 31 can move between the release position and a lip engaging position as shown in FIG. 5 in solid line. To move the pawls 31 to the release position, the lip engagement member 30 is moved away from the stopper body 10 and/or the sealing surface 13 (downwardly in FIGS. 4 and 5 as shown by the arrows and dashed line indication in FIG. 5) so that a part of the pawls 31 contacts a part of the stopper body 10 at the opening 17 through which the pawls 31 can extend to engage with a container neck. This contact between the pawls 31 and the stopper body 10 at the opening 17 pivots the pawls 31 to the release position against the bias of a spring 32 that urges the pawls 31 to move to the lip engaging position. In some embodiments, the lip engagement member 30 is mounted for movement with a carrier member 20, which is also slidably movable both toward and away from the stopper body 10 (up and down in FIGS. 4 and 5, respectively). Movement of the carrier member 20 away from the stopper body 10 and/or the sealing surface 13 causes the lip engagement member 30 to move away from the stopper body 10 and/or sealing surface 13 as well. (Movement of the carrier member 20 and the lip engagement member 30 can be caused by a carrier drive 4 (see FIG. 4), which is described in more detail below. However, in some embodiments the carrier member 20 and carrier drive 4 can be eliminated and the lip engagement member 30 moved by a handle or other actuator in a more direct way. For example, a handle mounted to the stopper 10 can be coupled to the lip engagement member e.g., by a linkage, to move the lip engagement member 30 relative to the stopper body 10.)

With the carrier member 20 and lip engagement member 30 positioned away from the stopper body 10 and a container neck received in the cavity 12, the handle 41 may be moved toward the closed position shown in FIG. 1 to engage the stopper 1 with the container 5. Movement of the handle 41 from the open position toward the closed position moves the carrier member 20 and the lip engagement member 30 toward the stopper body 10 (e.g., upward in the figures). This movement of the lip engagement member 30 takes the pawls 31 out of contact with the stopper body 10 at the openings 17, allowing the springs 32 to bias the pawls 31 to the lip engaging position as shown in solid line in FIG. 5. Distal ends of the pawls 31 opposite the pivot axes 33 are positioned below the lip 52 of the container neck, and as the handle 41 continues to move toward the closed position, the carrier member 20 and lip engagement member 30 are moved toward the stopper body 10, thus moving the pawls 31 toward the sealing surface 13 and toward the lip 52 of the container. Once the pawls 31 contact the lip 52 of the container, the lip engagement member 30 will stop movement relative to the container 5, and instead move the container opening 51 toward the sealing surface 13 as the pawl 31 (and lip engagement member 30 as a whole) move toward the sealing surface 13. As described more below, the lip engagement member 30 is resiliently biased to move toward the carrier member 20 (e.g., upwardly relative to the carrier member Thus, once the pawls 31 are engaged with the lip 52 of the container and the container opening 51 engages with the sealing surface 13, the lip engagement member 30 will no longer move toward or upwardly relative to the stopper body 10. However, the carrier member 20 will continue in movement toward the stopper body 10 against the resilient bias that urges the lip engagement member 30 to move toward the carrier member 20 until the handle 41 reaches the closed position. This results in the sealing surface 13 being resiliently biased against the portion of the container 5 at the opening 51, helping to maintain a proper seal at the opening 51. (In some embodiments, resilient bias on the sealing surface 13 to engage the sealing surface 13 with the container can be provided in other ways, such as by mounting the pawls 31 in a spring-biased fashion on the lip engagement member 30 (e.g., so a spring urges the pawls 31 to move upwardly relative to the lip engagement member 30 and is compressed when the pawls 31 engage the lip 51 and the sealing surface 13 is in contact with the container). In some embodiments, the sealing surface 13 can be mounted to the stopper body 10 so the sealing surface 13 is spring biased to move downwardly relative to the stopper body 10. Thus, once the sealing surface 13 contacts the container, the spring between the sealing surface 13 and the stopper body 10 can compress and maintain a resilient bias on the sealing surface 13 while allowing the sealing surface 13 to move relative to the stopper body 10. These arrangements can allow for the elimination of the carrier member 20, carrier drive 4, biasing element between the carrier member 20 and the lip engagement member 30, and so on.)

To remove the stopper 1 from the container 5, the handle 41 is moved from the closed position toward the open position, which causes the carrier member 20 and the lip engagement member 30 to move away from the stopper body 10. This moves the pawls 31 away from the sealing surface 13, allowing the sealing surface 13 to break the seal with the container 5 at the opening 51. This allows any gas pressure in the container 5 to be released. Although the seal with the container 5 is broken, the pawls 31 remain engaged with the lip 52 of the container 5 while the handle 41 is in an intermediate position between the open and closed positions, preventing removal of the stopper 1 from the container 5. This allows pressure to be vented or otherwise released without the pressure forcing the stopper 1 to be ejected from the container 5. Once the handle 41 is moved to the open position, the pawls 31 contact the stopper body 10 at the openings 17, moving the pawls 31 to the release position and allowing removal of the stopper 1 from the container.

Figure 6:
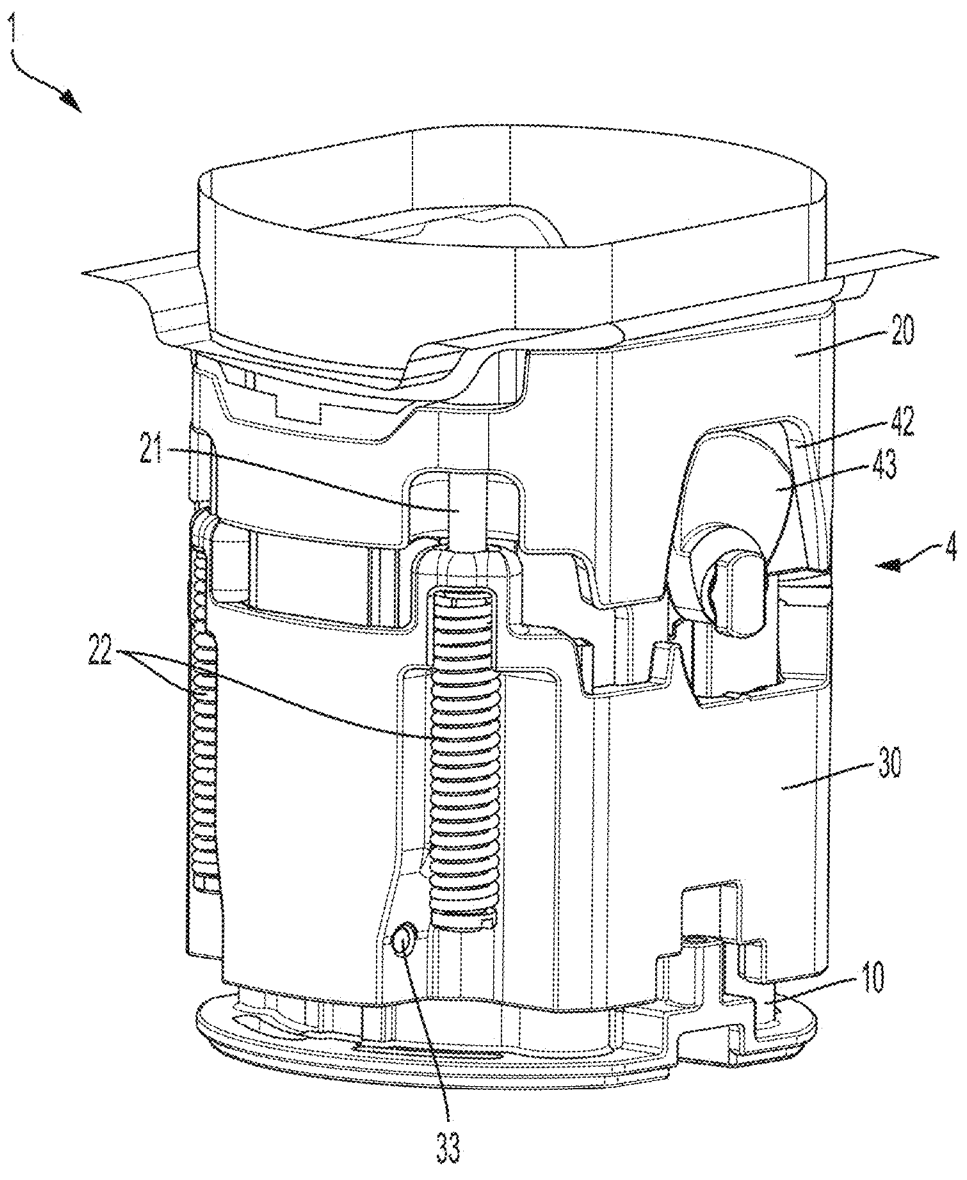
FIG. 6 shows a perspective view of the stopper with the outer housing and handle removed.

FIGS. 6-9 show a perspective view of the stopper body 10, carrier member 20 and the lip engagement member 30 with various parts removed to illustrate how the parts move relative to each other and operate to engage and disengage from a container 5. In FIG. 6, the outer housing 2 and handle 41 are removed. FIG. 6 shows the carrier drive 4 which in this embodiment includes a cam 43 and cam follower 42 that serve to move the carrier member and the lip engagement member 30 with movement of the handle 41. That is, the cam 43 is coupled to the handle 41, e.g., fixed to the handle 41, so that movement of the handle 41 between the open and closed positions rotates the cam 43 relative to the cam follower 42 and the carrier member 20. In FIG. 6, the cam 43 is in a position corresponding to the closed position of the handle 41, and thus the carrier member 20 is located toward the stopper body 10 (an uppermost position of the carrier member 20). Since the carrier member 20 is biased to move away from the stopper body 10 (downwardly) by the springs 25 (see FIG. 5), the cam 43 drives movement of the carrier member 20 toward the stopper body 10 against the bias of the springs 25 when the handle 41 is moved to the closed position. Likewise, when the cam 43 is rotated clockwise in FIG. 6 as the handle 41 is moved toward the open position, the lobe of the cam 43 allows the cam follower 42 and the carrier member 20 to move away from the stopper body 10 (downwardly in FIG. 6) under the bias of the springs 25. Note that in some embodiments, the handle 41 may be coupled to the carrier member 20 in other ways, such that rotation of the handle 41 drives movement of the carrier member 20 both toward and away from the stopper body 10, rather than just toward the stopper body 10 as in this embodiment. For example, other linkage arrangements than a cam and cam follower may be provided, or a cam and cam follower may be arranged to provide such movement (e.g., the cam may include a closed slot and the cam follower may include a pin that rides in the slot and drives movement of the carrier member 20 both toward and away from the stopper body 10).

Guides 21 extend downwardly from the carrier member 20 to guide movement of the lip engagement member 30 relative to the carrier member 20. In this embodiment, the guides 21 includes four pins that extend downwardly from the carrier member 20, but other guide arrangements are possible, such as one or more rails, slots, etc. and corresponding features on the lip engagement member 30. The guides 21 extend through holes in an upper portion of the lip engagement member 30, and a spring 22 is mounted on each guide 21 below the holes of the lip engagement member 30. The springs 22 are captured at a lower end of the guides 21 so the springs 22 cannot move below a bottom of the guide 21, and the springs 22 are arranged to bias the lip engagement member 30 to move toward the carrier member 20 (upwardly in FIG. 6). FIG. 6 shows the lip engagement member 30 in a position that corresponds to that in which a container neck is received in the cavity 12 and the pawls 31 are engaged with the lip 52 of the container 5 to urge the container 5 into contact with the sealing surface 13. Thus, the lip engagement member 30 is positioned away from the carrier member 20 and the springs 22 are compressed in FIG. 6, urging the pawls 31 (and the container neck) to move toward the sealing surface 13. Therefore, it is the springs 22 in some embodiments that provide the resilient bias to help establish and maintain a seal between the sealing surface 13 and the container opening 51. If no container neck was received in the cavity 12 and the handle 41 was in a closed position as in FIG. 6, the lip engagement member 30 would be positioned toward the carrier member 20 and the springs 22 would not be compressed (or compressed to a lesser degree). As discussed above, a resilient bias to help establish and maintain a seal between the sealing surface and the container opening can be provided in other ways, e.g., where the carrier member 20, guides 21 and springs 22 are eliminated and a spring coupling is provided between the lip engagement member 30 and/or the pawls 31 and the sealing surface 13.

In some embodiments, manipulation of the stopper 1 from a rest position relative to an engaged container can at least partially break a seal between the sealing surface 13 and the container opening 51. For example, tilting of the stopper 1 about a horizontal axis (where the stopper and container are oriented vertically) can cause the sealing surface 13 to be tilted or otherwise oriented to lose contact with or reduce a contact force on the container opening 51. This can allow pressure in the container to be vented even while the stopper 1 is fully engaged on the container, e.g., with the handle 41 in the closed position. Tilting or other manipulation of the stopper 1 relative to the container can be permitted in some embodiments by the springs 22 which provide a resilient bias between the lip engagement member 30 (and pawls 31) and the sealing surface 13. That is, movement of the stopper body 1 can cause one or more of the springs 22 to compress more than others and so allow the sealing surface 13 to be moved relative to the container opening 51. This can cause the seal between the sealing surface 13 and the container opening 51 to broken, at least momentarily, so pressure in the container can be vented. Release of the stopper 1 can allow the stopper 1 to move back to a rest position where the springs 22 equally bias the sealing surface 13 into engagement with the container opening 51. Other biasing arrangements that provide a resilient force to engage the sealing surface 13 with the container opening 51 can permit manipulation of the stopper 1 and consequent venting. For example, a spring bias between the pawls 31 and the lip engagement member 30 and/or a spring bias between the sealing surface 13 and the stopper body 10 can permit manipulation of the stopper and venting while the stopper 1 remains engaged with the container 5.

Figure 7:
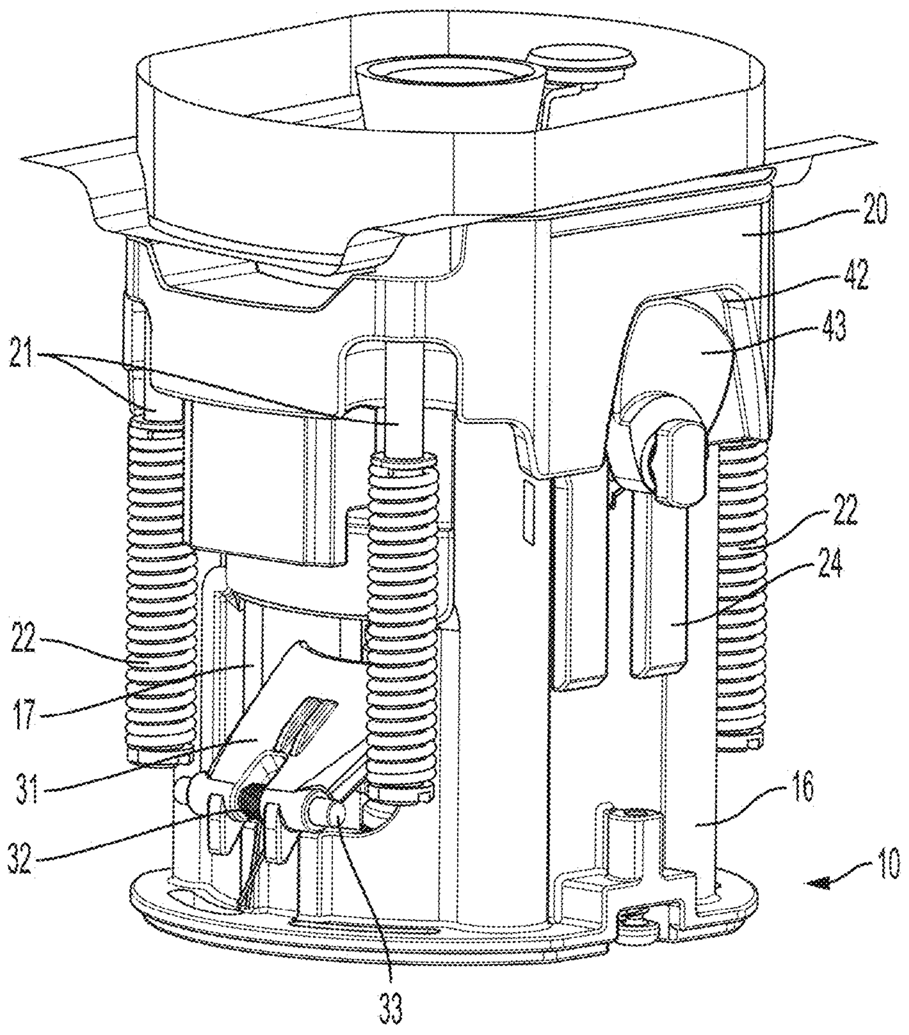
FIG. 7 shows the stopper of FIG. 6 with a sleeve portion of the lip engagement member removed.
Figure 8:
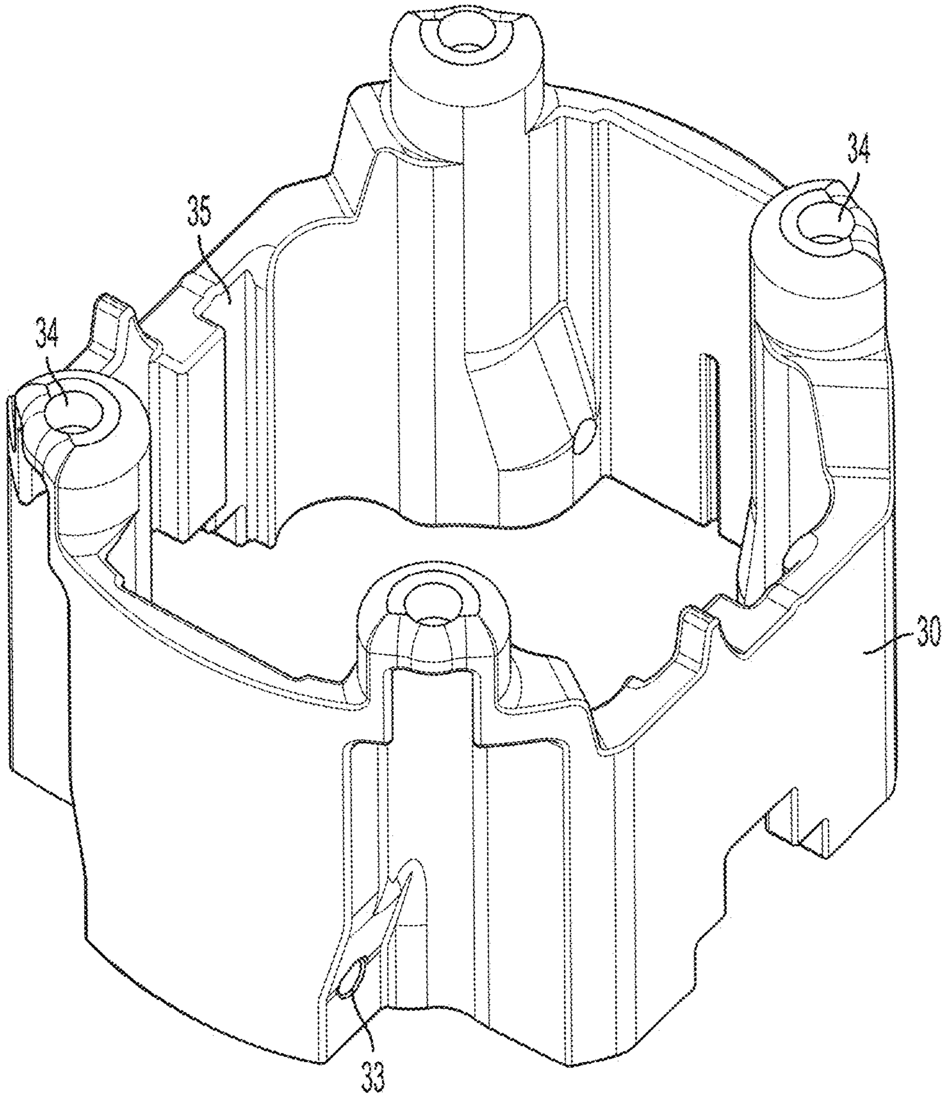
FIG. 8 shows a perspective view of the sleeve element of the lip engagement member.

FIG. 7 shows a view of the FIG. 6 arrangement with a sleeve part of the lip engagement member 30 removed from view. The pawls 31 can be seen in the lip engaging position, extending through a corresponding opening 17 in the stopper body 10 to engage a container neck. Torsion springs 32 that bias the pawls 31 to move toward the lip engaging position can be seen as well. Because the pawl pivot 33 is located suitably relative to the opening 17, the pawls 31 are out of contact with the stopper body 10 at the opening 17, allowing the pawls 31 to move under the spring 32 bias to the lip engaging position. However, if the lip engagement member 30 is moved away from the stopper body 10 (downwardly) from the position of FIG. 7, the pivot 33 and pawl 31 are moved such that the pawl 31 contacts the stopper body 10 at the opening 17 and moves the pawl 31 to the release position. This movement occurs when the handle 41 is moved to the open position, and is driven by the springs 25 urging the carrier member 20 and the lip engagement member 30 to move away from the stopper body 10 as the cam 43 rotates to permit the cam follower 42 to move away from the stopper body 10 (downwardly in FIG. 7). FIG. 8 shows a perspective view of the sleeve portion of the lip engagement member 30 without the pawls 31 and springs 32. The sleeve portion of the lip engagement member 30 in this embodiment extends around the sidewall 16 of the stopper body 10. Holes 34 that receive the guides 21 can be seen, as well as slots 35 that receive rails 24 of the carrier member 20 to help guide movement of the lip engagement member 30 relative to the carrier member 20.

Figure 9:
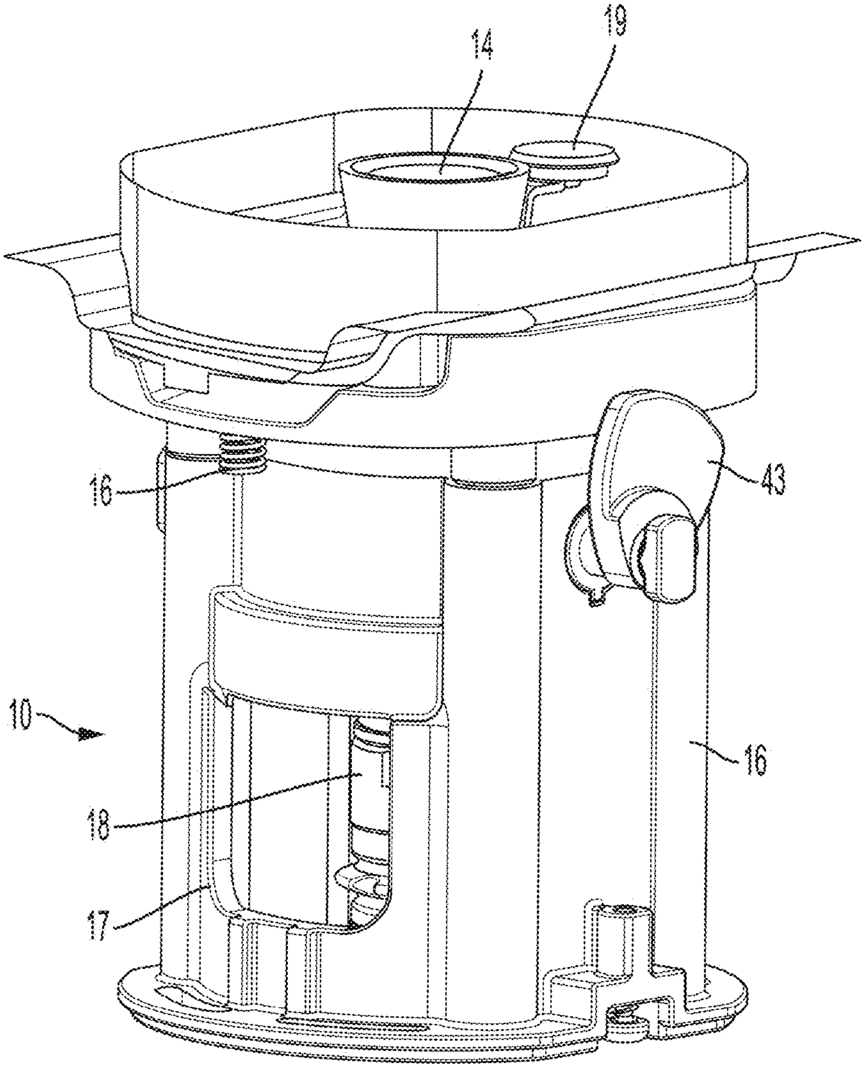
FIG. 9 shows the stopper of FIG. 6 with a sleeve portion of the lip engagement member and the carrier member removed.
Figure 10:
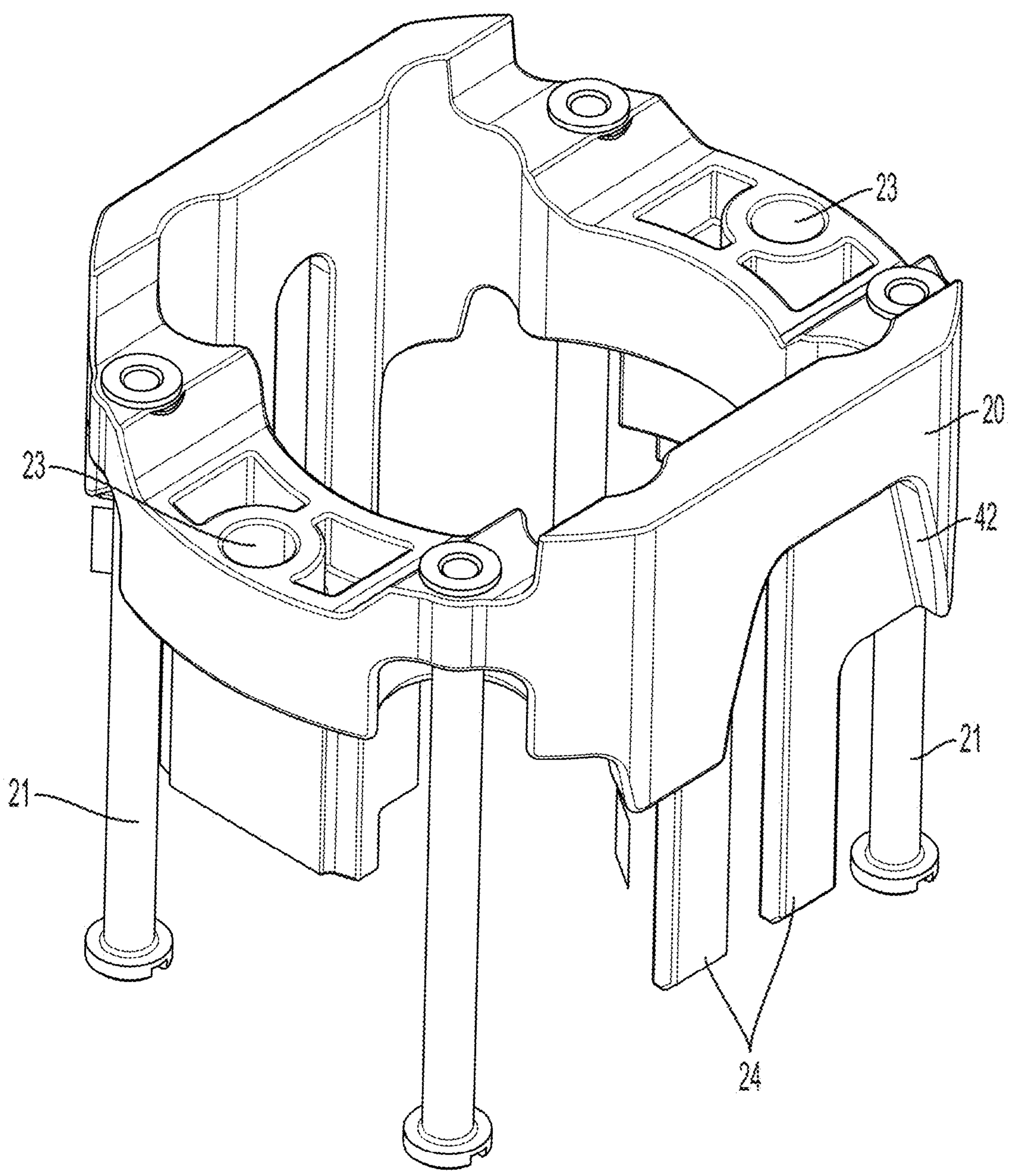
FIG. 10 shows a perspective view of the carrier member.

FIG. 9 shows a view of the FIG. 6 arrangement with the lip engagement member 30 and carrier member 20 removed from view. This reveals the springs 25 which bias the carrier member 20 to move away from the stopper body 10, and that the cam 43 is pivotally mounted to a bushing in the sidewall 16 of the stopper body 10. FIG. 10 shows the carrier member 20 isolated from other parts of the stopper 1, and illustrates pockets 23 to receive the springs 25, as well as the rails 24 which engage with the slots 35 of the lip engagement member 30. In this embodiment, the carrier member 20 is arranged generally as a ring to support the guides 21 and the rails 24, as well as the cam follower 42. Since the carrier member 20 supports the guides 21, the lip engagement member 30 is mounted to the carrier member 20, although movable relative to the carrier member 20.

Any suitably arranged gas source can be used to provide pressurized gas to the inlet port 14. For example, a gas source including a cylinder of pressurized CO2 may be fluidly coupled to the gas inlet port 14 by a quick-connect type fitting, threaded fitting, press fit or other suitable engagement such as simply having a user hold the gas source against the inlet port 14. The gas source may include a pressurized gas container, such as a gas cylinder that holds a suitable gas (carbon dioxide, nitrogen, argon, etc.) under relatively high pressure such as 100-3000 psi. The gas source may include a pressure regulator, which may include a regulating valve or valves, a flow restrictor such as a restriction orifice, and/or other arrangement to control a gas flow rate and/or pressure provided to the gas inlet port 14. Alternately or in addition, such features may be provided with the stopper 1. The gas source may also include a valve that can be operated by a user to control the flow of gas. For example, a user can press a button of the valve to cause gas to flow into the container 5, and release the button to stop gas flow. The gas source may provide gas at two or more selectable pressures and/or flow rates, if desired. For example, gas may be provided at a first pressure and/or first flow rate, e.g., to displace any air in the container 5 with a suitably inert or non-reactive gas from the gas source. Displaced air may be vented through the stopper 1 via a vent as mentioned above. In some cases, a vent may be manually operated by a user, e.g., by pressing a button. A second pressure and/or second flow rate may be higher than the first pressure and may be suitable to establish a storage pressure in the container 5, e.g., to help maintain a desired carbonation level in the container 5. Since the stopper 1 may seal the opening 51 of the container closed, an above-ambient pressure may be maintained in the container 5 interior space for an extended period, such as 1 day, 1 week, 1 month or more. The gas inlet port 14 or other portion of the gas inlet pathway may include a check valve or other one-way valve that allows gas flow into the container 5 but resists gas flow out of the container 5. In addition or alternately, the gas inlet port 14 may be capped or otherwise closed to prevent pressure leakage.

While aspects of the invention have been shown and described with reference to illustrative embodiments, it will be understood by those skilled in the art that various changes in form and details may be made therein without departing from the scope of the invention encompassed by the appended claims.

The invention claimed is:

1. A stopper for use with a beverage container having a neck, an opening at the neck to access an interior space of the container, and a lip on an outer surface of the neck, the stopper comprising:

a stopper body having a sealing surface arranged to contact and form a seal with a portion of the neck around the opening;

a carrier member mounted for sliding movement relative to the stopper body; and a lip engagement member including a pawl mounted for pivotal movement between a lip engaging position for engaging with the lip on the container neck and a release position, the lip engagement member being mounted for sliding movement relative to the stopper body and relative to the carrier member, the lip engagement member being resiliently biased for movement toward the carrier member by a first resilient element.

2. The stopper of claim 1, wherein the lip engagement member is arranged for sliding movement to move the pawl toward and away from the sealing surface.

3. The stopper of claim 1, wherein the carrier member and the lip engagement member are arranged for sliding movement in directions toward and away from the stopper body.

4. The stopper of claim 3, wherein movement of the carrier member toward the stopper body urges the pawl to move toward the sealing surface.

5. The stopper of claim 3, wherein the carrier member is resiliently biased to move away from the stopper body by a second resilient element.

6. The stopper of claim 5, further comprising a carrier drive arranged to move the carrier member relative to the stopper body.

7. The stopper of claim 6, wherein the carrier drive includes a cam and cam follower arranged to move the carrier member relative to the stopper body based on rotation of the cam.

8. The stopper of claim 7, wherein the cam is pivotally mounted to the stopper body for rotation, and the cam follower is arranged on the carrier member, the carrier drive including a handle attached to the cam and arranged for movement by a user to rotate the cam.

9. The stopper of claim 8, wherein the handle is movable between a closed position, an intermediate position and an open position, the intermediate position being between the open and closed positions, and wherein with the handle in the open position, the carrier member and the lip engagement member are positioned away from the stopper body and the pawl is in the release position to receive the container neck, and wherein movement of the handle from the open position to the closed position moves the pawl to the lip engaging position and moves the carrier member and the lip engagement member toward the stopper body, movement of the lip engagement member toward the stopper body continuing until the pawl engages with the lip and the sealing surface engages with the portion of the neck around the opening whereupon the carrier member continues movement toward the stopper body and away from the lip engagement member against urging of the first resilient element but the lip engagement member ceases movement toward the stopper body.

10. The stopper of claim 1, wherein sliding movement of the lip engagement member away from the stopper body moves the pawl from the lip engaging position to the release position, and movement of the lip engagement member toward the stopper body moves the pawl from the release position to the lip engaging position.

11. The stopper of claim 10, wherein the stopper body includes a sidewall that defines a cavity into which the neck of the container is received, the sidewall including an opening into which the pawl extends in the lip engaging position to engage with the lip of the container.

12. The stopper of claim 11, wherein the pawl is spring biased to move toward the lip engaging position and movement of the lip engagement member away from the stopper body causes a portion of the sidewall at the opening to contact the pawl and move the pawl to the release position against the spring bias.

13. The stopper of claim 1, wherein the stopper body includes a cup-shaped body having a sidewall that defines a cavity and an opening at a lower end to receive the neck of the container into the cavity, and wherein the sealing surface is located in the cavity at a side opposite the opening.

14. The stopper of claim 13, wherein the lip engagement member includes a sleeve positioned around the sidewall of the stopper body and slidably movable relative to the stopper body.

15. The stopper of claim 14, wherein the pawl is pivotally mounted to the sleeve.

16. The stopper of claim 15, wherein the carrier member includes a ring positioned around the sidewall of the stopper body and slidably movable relative to the stopper body.

17. The stopper of claim 16, wherein the carrier member includes a guide along which the sleeve of the lip engagement member is movable relative to the carrier member, the guide including the first resilient element in the form of a spring arranged to bias the sleeve to move toward the ring.

18. The stopper of claim 1, wherein the stopper body includes a gas pathway arranged to introduce pressurized gas into the container, the gas pathway extending from a top of the stopper body to a location adjacent the sealing surface.

19. The stopper of claim 1, further comprising a handle arranged for movement by a user to move the carrier member and the lip engagement member relative to the stopper body.

20. The stopper of claim 19, wherein the handle is movable between a closed position, an intermediate position and an open position, the intermediate position being between the open and closed positions, and wherein with the handle in the open position, the carrier member and the lip engagement member are positioned away from the stopper body and the pawl is in the release position to receive the container neck, and wherein movement of the handle from the open position to the closed position moves the pawl to the lip engaging position and moves the carrier member and the lip engagement member toward the stopper body, movement of the lip engagement member toward the stopper body continuing until the pawl engages with the lip and the sealing surface engages with the portion of the neck around the opening to form the seal whereupon the carrier member continues movement toward the stopper body and away from the lip engagement member against urging of the first resilient element but the lip engagement member ceases movement toward the stopper body.

21. The stopper of claim 20, wherein movement of the handle from the closed position to the intermediate position causes the carrier member and the lip engagement member to move away from the stopper body such that the seal is broken but the pawl remains in the lip engaging position.

* * * * *